(12) United States Patent
Uhlhorn (10) Patent No.: US 7,630,641 B1
(45) Date of Patent: Dec. 8, 2009

(54) OPTICAL NETWORK MONITORING

(75) Inventor: Brian L. Uhlhorn, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 513 days.

(21) Appl. No.: 11/497,840

(22) Filed: Aug. 2, 2006

(51) Int. Cl.
*H04B 10/12* (2006.01)

(52) U.S. Cl. .......................... 398/77; 398/28
(58) Field of Classification Search ............ 398/21, 398/77, 28–29
See application file for complete search history.

(56) References Cited

U.S. PATENT DOCUMENTS

| | | | |
|---|---|---|---|
| 4,911,515 A * | 3/1990 | So et al. ............ 398/28 |
| 5,907,417 A * | 5/1999 | Darcie et al. ............ 398/20 |
| 6,519,026 B1 | 2/2003 | Holland |
| 6,674,518 B1 | 1/2004 | Asher et al. |
| 6,831,773 B2 | 12/2004 | Pfeiffer et al. |
| 6,862,397 B2 | 3/2005 | Harres et al. |
| 6,980,287 B2 | 12/2005 | Renard et al. |
| 7,042,559 B1 | 5/2006 | Frigo et al. |
| 2004/0047543 A1 | 3/2004 | Hiironen et al. |
| 2004/0197107 A1 | 10/2004 | Fathallah |
| 2004/0264965 A1 | 12/2004 | Kobayashi et al. |
| 2005/0036200 A1 | 2/2005 | Menif et al. |
| 2005/0084266 A1 | 4/2005 | Pohjola et al. |
| 2006/0115272 A1 | 6/2006 | Minato et al. |

* cited by examiner

*Primary Examiner*—Leslie Pascal
(74) *Attorney, Agent, or Firm*—Brooks, Cameron & Huebsch, PLLC (57) ABSTRACT

One method embodiment for monitoring an optical pathway includes emitting an optical signal from an optical emitter, encoding the optical signal with a monitoring optical code division multiple access (OCDMA) code, directing the optical signal with the monitoring OCDMA code into the optical pathway, receiving reflected light associated with the monitoring OCDMA code from the optical pathway, and determining a status of the optical pathway based on the reflected light.

27 Claims, 4 Drawing Sheets

Fig. 4A — WITHOUT "FILLER" CODES

Fig. 4B — WITH "FILLER" CODES

Fig. 4C — WITH "FILLER" CODES AND OTDR PULSE CODE

Fig. 5

OPTICAL NETWORK MONITORING

FIELD OF THE INVENTION

The present disclosure generally relates to monitoring fiber optic pathways. And, in particular, the present disclosure relates to health and status monitoring of optical pathways in optical networks, and other such fields.

BACKGROUND

In optical fiber communications, it is often desirable and/or beneficial to monitor the health and status of an optical link, or optical pathway, for various purposes. For example, sometimes a link has to be analyzed to determine if a disconnect or fault in the optical pathway exists and/or where the fault is located.

Optical Time-Domain Reflectometry (OTDR) is one method used to locate such faults (e.g., a disconnect and/or break in the fiber) in fiber optic networks. In this method, a laser pulse is sent down a test fiber and reflected back by a fault in the optical pathway.

The reflected laser pulse is then received by a photodetector. The time period elapsed since the signal was sent indicates how far down the pathway the fault is located.

In order to test the optical pathway, the testing equipment can be connected via a fiber access point which adds components to the optical network and can degrade the signal as it travels along the optical pathway. Alternatively, in systems where optical pathways forming an optical network are constructed using a number of optical fibers, each forming a section of the pathway, an end of an optical fiber section can be located and disconnected from the optical network.

In such systems, each optical fiber section is attached to the end of another optical fiber section. In some embodiments, an end of one of the optical sections can be accessed and the testing apparatus can be connected thereto.

Such methods can result in periods where the fiber is out of the communications network and, therefore, can result in network downtime. However, the use of a separate testing apparatus to locate faults within an optical fiber can be time consuming and costly.

Current OTDR methods are not able to provide for the simultaneous transmission of data and OTDR pulses due to OTDR pulses interfering with data pulses, which can result in inaccurate detection by data receivers. One prior solution, which can be used in optical networks that employ wavelength division multiplexing (WDM) in order to avoid such interference, is to use separate wavelength channels for OTDR pulses and the data stream pulses. However, such methods may create inefficiencies by using an entire wavelength channel for OTDR pulses and thereby can reduce the ability for the channel to be used to transmit data.

Additionally, such OTDR methods may not adequately protect against and/or monitor security breaches (e.g., unauthorized "eavesdropping" by accessing a data stream). For instance, an unauthorized entity could avoid being detected by tapping only the wavelength channel or channels used for data transmission, while the channel used for OTDR pulses remains undisturbed.

SUMMARY

Embodiments of the present disclosure provide various methods, apparatuses, and systems for monitoring the health and/or status of an optical network. In various embodiments, an optical pathway (e.g., an optical fiber) can be monitored with components within an optical communication network such that the optical fiber can remain connected to the network.

That is, various embodiments can provide for monitoring an optical network and/or an optical pathway without using external equipment or without having to open an optical connector to insert monitoring equipment. Such embodiments can reduce the number of components used to monitor the network and/or can provide for continuous monitoring of the network, among other benefits.

Various embodiments can be used to determine a location of a fault and/or transmission loss in an optical fiber. A fault can refer to various discontinuities such as a bend, a crack, a break, or a connection point to another optical fiber, among other discontinuities in an optical pathway.

One method embodiment discussed herein for monitoring an optical pathway includes emitting an optical signal from an optical emitter, encoding the optical signal with a monitoring optical code division multiple access (OCDMA) code, and directing the optical signal with the monitoring OCDMA code into the optical pathway. In various embodiments, the emitter can be a light source such as a laser (e.g., a mode-locked laser, a Fabry-Perot laser, a Vertical Cavity Surface Emitting Laser (VCSEL)), an array of such lasers, or other light emitting sources.

The OCDMA encoding can be temporal coding in which a light pulse is divided into a temporal chip sequence that can represent a data bit. The OCDMA encoding can also be two-dimensional coding in which a light pulse is modified in the time and wavelength domain (e.g., the coding is a combination of temporal and spectral coding).

An example of two-dimensional OCDMA encoding is referred to as frequency hopping. Two dimensional OCDMA codes can use a number of different wavelength channels (or frequency bands) within a range of wavelengths and a number of time slots in a bit interval in order to transmit multiple data signals over a shared bandwidth.

Each of the multiple data signals can be identified by a specific OCDMA code (e.g., a spreading code), which may be unique to a particular data signal and/or user associated therewith. In this manner, multiple transmitted data signals can share the same frequency band at the same time.

Many such systems transmit and receive encoded signals. The optical signal can be encoded and/or decoded using various optical technologies that include Fibre Bragg Grating (FBG) technology, Arrayed Waveguide Grating (AWG) technology, among various other optical technologies.

Various embodiments can receive reflected light associated with monitoring the OCDMA code from the optical pathway and determine a status of the optical pathway based on the reflected light. For example, a light pulse, or a portion thereof, encoded with the monitoring OCDMA code, can be reflected off of a discontinuity (e.g., a fault) in the optical pathway.

The reflected (e.g., backscattered) light can be decoded by the appropriate OCDMA code and received by an optical receiver. The optical receiver can be a photodetector such as a p-i-n (positive, intrinsic, and negative) diode detector, among other optical receivers.

In various embodiments, a status of the optical pathway can be determined by a logic component, for example, based on the timing of when the optical signal was transmitted and when the reflected light was received. For instance, in various embodiments, the status can include the location of a fault in the optical pathway determined based on the timing and/or quantity of reflected light corresponding to the monitoring OCDMA code. In such embodiments, the monitoring OCDMA code may be referred to as an optical time domain reflectometry (OTDR) pulse code since an OTDR methodology can be used to monitor and/or characterize the optical fiber (e.g., determine a location of a fault) based on the reflected light corresponding to the monitoring OCDMA code.

The logic component can, for example, be used to compute the distance of a reflection point (e.g., a discontinuity in the fiber) based upon the elapsed time between the emitting of a light wave and the reception of a reflected light wave. In some embodiments, the logic component can suggest a type of reflection point (e.g., a break, bend, crack, or connection point) based upon the intensity of a reflected light wave.

In some embodiments, the logic component can be coupled to a transmitter for communicating monitoring information to a remote device. In various embodiments, the optical emitter, receiver, encoder, and decoder can be a part of a transceiver that is coupled to the fiber optic pathway and configured to perform OTDR. In some embodiments, the transceiver can include a tunable OCDMA encoder/decoder component that switches to an inverse of an OTDR pulse code after the OCDMA encoded signal is encoded. In some such embodiments, the encoder/decoder component switches to a particular inverse of the OTDR pulse code depending on the location of a specific reflecting discontinuity of the fiber optic pathway.

In various embodiments of the present disclosure, the monitoring OCDMA code can be embedded in an OCDMA data stream. For example, an OCDMA data stream can represent a binary signal in which a logic "1" is represented by a first OCDMA code and a logic "0" is represented by a second OCDMA code.

In various embodiments, the OCDMA code corresponding to a logic "0" may have an associated energy/power level of zero. However, the OCDMA code corresponding to a logic "0" may also have an associated energy/power level different from zero (i.e., the logic "0" code may be a "filler" code).

A "filler" code may be used to reduce and/or prevent eavesdropping on the data stream that would be done by monitoring power levels associated with the OCDMA codes. That is, it can be more difficult for an eavesdropper to distinguish between data bits that both have an associated energy level than to distinguish between one data bit that has an associated energy level and one data bit that does not.

In such embodiments, the monitoring OCDMA code can replace one or more of the codes corresponding with a logic "0" in the OCDMA data stream. In such embodiments, the decoder can filter out the monitoring OCDMA code such that it does not interfere with the data stream.

Also, because the monitoring OCDMA code is different than the logic "0" and logic "1" codes, the data stream may not interfere with the monitoring OCDMA code. In this manner, the data stream can be received at an optical receiver and measured, while the monitoring OCDMA code can be used to monitor the optical pathway (e.g., backscattered light corresponding to the monitoring OCDMA code can be received by an optical detector in order to determine a fault location in the optical pathway).

In some embodiments, the optical fiber can be a part of bidirectional optical network. In such embodiments, the OCDMA decoder may be tunable such that the optical receiver can receive both an OCDMA data stream and the reflected monitoring OCDMA code that can be used to determine a fault location.

Accordingly, in such bidirectional networks, the use of separate receivers to measure data and to monitor the status of the optical fiber can be avoided, in some embodiments. For instance, the decoder can be configured (e.g., tuned) to filter out the monitoring code when the receiver is to measure data and can be configured to filter out the data codes when the receiver is to measure the reflected monitoring OCDMA code.

Furthermore, the monitoring OCDMA code can be a unique code (e.g., different than the codes used for data) such that the reflected monitoring code can be distinguished from data and/or other reflected light. These unique-codes can also take into account other properties of the optical network such as wavelength dispersion among other effects. Distinguishing reflected light corresponding to the reflected monitoring code from other reflected light can be useful, for example, for increasing the precision of fault location measurements.

The functions discussed above can be accomplished, for example, by logic circuitry and/or by having a processor and memory within or attached to the optical device or system. For instance, computer executable instructions can be provided in the memory and executable by the processor to communicate with the emitter and/or receiver to obtain information about the emission and/or receipt of a light wave. Logic circuitry can be utilized to accomplish such functions instead of or in addition to computer executable instructions. These and other advantages of the various embodiments of the present disclosure will become evident to those skilled in the art upon reading the disclosure.

DETAILED DESCRIPTION

The present disclosure includes a number of method, apparatus, and system embodiments for monitoring optical networks by transmitting and receiving light waves. Embodiments of the present disclosure will now be described in relation to the accompanying drawings, which will at least assist in illustrating the various features of the various embodiments.

Figure 1:
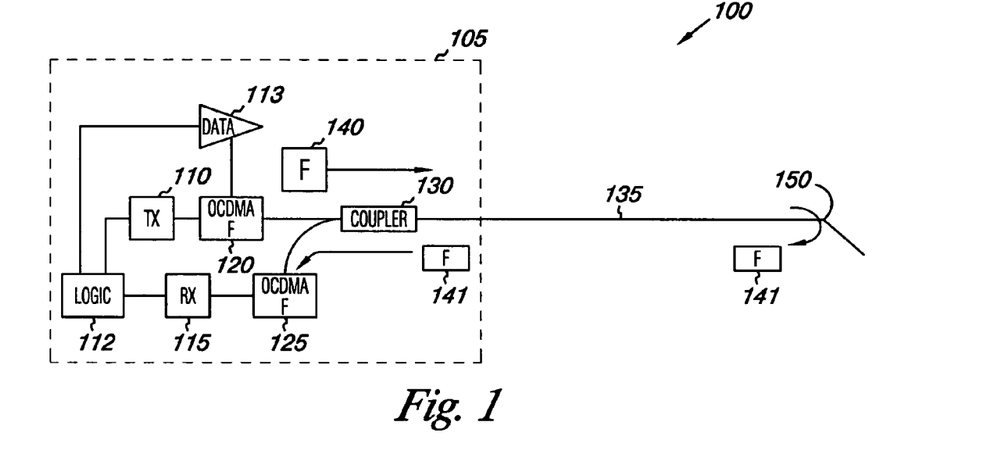
FIG. 1 is an illustration of an embodiment of an optical network of the present disclosure.

FIG. 1 is an illustration of an embodiment of an optical network of the present disclosure. The embodiment shown in FIG. 1 illustrates an optical network 100 which provides for optical code division multiple access (OCDMA). Embodiments of the present disclosure are not limited to a particular type of optical network. For example, a suitable optical network (e.g., network 100) can include a Passive Optical Network (PON), a Transparent Optical Network (TON), and/or an Ultra High Speed Optical Network (UON), among other optical network types which may have architectures based on an optical star, optical ring, optical linear bus, or various other architectures.

As described in detail below in connection with FIG. 4, OCDMA can include encoding optical signals by using several wavelengths which can be spread over time. OCDMA differs from other techniques such as time division multiplexing (TDM) and wavelength division multiplexing (WDM). In WDM, each user transmits data at a specific wavelength. The data can be sent at any time, but other users may not use the specific wavelength of that user.

In TDM, users of an optical network are assigned specific time periods in which their data is transmitted. In contrast, OCDMA allows multiple users to simultaneously transmit data streams at the same wavelength via a specific signature code composed of temporal and wavelength components.

In the embodiment illustrated in FIG. 1, network 100 includes a transceiver 105 for sending and receiving light waves (e.g., OCDMA encoded signals) along an optical pathway (e.g., optical fiber 135). In various embodiments, the transceiver 105 can perform optical time domain reflectometry (OTDR) by transmitting a particular OCDMA signature code into an optical fiber 135 and timing the arrival of reflected (e.g., backscattered) light corresponding with the particular OCDMA signature code. OTDR measurements can provide benefits such as detecting a fault location in the optical fiber or detecting a "tap" (e.g., an unauthorized access into the fiber by an eavesdropper) among other benefits.

In various embodiments, the transceiver 105 can transmit OCDMA data streams (e.g., transmitted information associated with a user of network 100) and/or particular OCDMA codes used to monitor the status of the optical fiber and/or network (e.g., via OTDR). As described in detail in connection with FIG. 4, in various embodiments, the particular OCDMA signature code (e.g., a monitoring OCDMA code or OCDMA OTDR pulse code) used to obtain OTDR measurements, can be embedded within an OCDMA data stream.

Embedding a monitoring OCDMA code within a data stream can provide various benefits. For instance, it can allow the transceiver 105 to monitor a fiber (e.g., via OTDR) and transmit data, which can reduce or eliminate a need to provide separate OTDR testing and data transmitting devices.

Furthermore, the ability of transceiver 105 to transmit OCDMA data streams embedded with one or more OCDMA monitoring codes can allow a Built-In Test (BIT) to be running continuously. That is, in various embodiments, the optical link does not have to be switched between a BIT mode and a data transmission mode.

For example, the monitoring codes can replace various "0" bit transmissions throughout the data stream and can be used to test/monitor the optical fiber while data is being transmitted. Also, embedding OCDMA OTDR pulse codes (e.g., monitoring codes) within an OCDMA data stream can reduce the likelihood of an eavesdropper avoiding detection.

For instance, since both OCDMA data codes and OCDMA OTDR pulse codes can simultaneously use the same wavelengths, an eavesdropper may not be able to avoid detection by tapping a wavelength channel that is used for data but not OTDR (e.g., as may be done in optical networks employing WDM). Similarly, an eavesdropper may not be able to avoid detection by appropriately timing when to tap a data stream (e.g., as may be possible in an optical network employing TDM).

The optical fiber 135 may be made up of a number of optical fiber sections that are connected end to end by a number of connectors. In the example shown in FIG. 1, the fiber 135 has a reflecting discontinuity 150. The reflecting discontinuity 150 can be any type of fault that would reflect light transmitted from emitter 110 back to a receiver 115 of the transceiver 105. For example, the fault can be a defect in the optical fiber, a break in the optical pathway, the end of an optical fiber section, or other such discontinuity.

The transceiver can include various components. As shown in FIG. 1, the transceiver 105 includes an optical emitter 110, an OCDMA encoder 120, an optical receiver 115, an OCDMA decoder 125, and a coupler 130. The emitter 110 can be a light emitting optical transmitter such as a laser (e.g., a mode-locked laser or VCSEL) or an array of such lasers, among other light emitting sources.

As described herein, optical signals transmitted from emitter 110 can be encoded with various OCDMA codes such as monitoring codes (e.g., OCDMA OTDR pulse codes) that can be used to monitor an optical network (e.g., network 100). As described in detail in connection with FIG. 4, the OCDMA encoded signals can also represent one or more binary data streams which can include one or more monitoring codes embedded therein. Information to be transmitted (e.g., data) can be provided to the encoder 120 via a modulation signal generator 113.

In the embodiment illustrated in FIG. 1, the OCDMA encoder 120 encodes an optical signal to be transmitted with a monitoring OCDMA code (e.g., an OCDMA OTDR pulse code shown as signature code "F"). Code "F" represents a particular OCDMA code signature of an optical signal transmitted by emitter 110. The encoder 120 can employ various filtering technologies such as Fibre Bragg Grating (FBG), Array Waveguide Grating (AWG), or thin film filters, among other encoding/decoding technologies.

In various embodiments, the encoder 120 can include a modulator coupled to a multiplexer and a demultiplexer having a number of delay lines therebetween. The modulator can be an Electro Absorption Modulator (EAM) or Electro Optic Modulator (EOM), among other types of modulators. In some embodiments, the encoder may be a fixed encoder (e.g., an encoder which encodes optical signals with one particular OCDMA code).

However, in various embodiments, the encoder can be "tunable" such that the encoder can encode optical signals with two or more different OCDMA codes. As an example, some encoders and/or decoders can employ tunable delay lines (e.g., delay lines of different lengths) in order to provide a tunable encoder/decoder component. If the encoder is a fixed encoder (e.g., an encoder having constant delay lines), multiple encoders and multiple transmitters or optical switches can be used to provide coding of optical signals with several different OCDMA codes.

An encoded optical signal (e.g., encoded signal 140) can pass through an optical coupler 130 and propagate down the optical fiber 135. Upon reaching a discontinuity in the fiber (e.g., reflection point 150) the optical signal or a portion thereof can be reflected (e.g., backscattered) back toward the transceiver 105 along fiber 135. The reflected signal 141 can be directed through the optical coupler 130, decoded by decoder 125, and the decoded signal can be received by an optical receiver 115.

In the embodiment of FIG. 1, the decoder 125 is configured to filter out from the reflected optical signal 141 OCDMA codes other than code "F." In this manner, a status of the optical pathway (e.g., fiber 135) can be determined based on the reflected light associated with the OCDMA code "F" (e.g., by utilizing OTDR methodology).

For instance, in various embodiments of the present disclosure, the transceiver 105 can be configured to determine a location of a discontinuity (e.g., reflection point 150) along an optical pathway (e.g., fiber 135) by measuring the time elapsed between the transmission of an ODCMA encoded signal (e.g., encoded signal 140) and the reception of the reflected signal (e.g., 141) to an optical receiver (e.g., optical receiver 115). In such embodiments, the OCDMA code encoded in the transmitted optical signal can be a monitoring OCDMA code (e.g., an OCDMA OTDR code).

The receiver 115 can be a photodetector such as a p-i-n diode detector, among other optical receivers. In various embodiments, the receiver 115 can receive both OCDMA data codes and monitoring codes. As an example, in a bidirectional network, such as bidirectional network 300 shown in FIG. 3, it can be beneficial for a receiver (e.g., receiver 115) to receive optical signals that are transmitted down an optical fiber in both directions. For instance, the number of transceiver components can be reduced if the receiver can receive OCDMA signals having signature codes corresponding to one or more data streams transmitted directly from one end of the optical fiber to the receiver, as well as reflected OCDMA signals having signature codes corresponding with reflected monitoring codes transmitted from an opposite end of the optical fiber.

In embodiments in which the receiver can measure OCDMA data codes (e.g., a data signature "W" and a data signature "Q", which can represent different OCDMA signatures than signature code "F") and monitoring codes (e.g., signature code "F"), a tunable OCDMA decoder can be utilized. In such embodiments, the decoder can be tuned to filter out OCDMA signals other than those associated with a particular OCDMA signature code or codes (e.g., codes "W" and "Q" in this example") when data signals corresponding with those particular codes are to be received. In such embodiments, the decoder can also be tuned to filter out OCDMA codes not associated with a different OCDMA code (e.g., code "F") which can correspond with a reflected optical signal and can be used to determine a network status (e.g., a location of a fault in optical fiber 135), etc.

As stated above, an optical emitter and/or receiver component of transceiver 105 can be connected to a logic component 112 that can be used to perform various functions. For example, the logic component can perform various OTDR functions such as determining if the light received by the receiver 115 is that of the reflected light associated with a particular OCDMA code. The logic component can also control the modulation signal generator 113, among various other functions.

The logic component 112 can be circuitry provided within or associated with the transceiver 105 or a processor within or associated with one or more of the components. In various embodiments, the logic component can also be resident on a remote device (e.g., remote device 360 shown in FIG. 3) that is not part of the optical system or network.

For example, a logic component can be resident on a personal, mainframe, or server type computer. Further, the communication of information from the emitter, the receiver, and/or the logic component to a remote device can be accomplished in a wired or wireless manner.

Once information is received from the emitter and/or receiver component, the information can be compared to thresholds or to information stored in memory to identify whether the information indicates a fault is present. The information can also be used to determine how far away the fault is.

For example, an OTDR methodology can be used to determine the location of the fault. Accordingly, in some embodiments, the logic components can include a clock or other timing mechanism to aid in such determinations.

Embodiments of the present disclosure can also provide information about the type of disconnect that is present and information about the quality of the signal being generated and received. For example, in some embodiments, the percentage of reflected light can provide an indication as to the type of disconnect in the optical pathway. For instance, the end of a section of optical fiber can generate a measurable and predictable reflected quantity of light (e.g., 4% of emitted light is reflected from an un-terminated fiber facet).

If the break is not generally perpendicular to the optical pathway, as a section end would be, but is rather, a jagged break or a defect in the optical pathway, the result can be less predictable. However, the results may be able to be classified based upon the received information in order to determine whether the break is clean or jagged, etc. This information may be used to determine the course of action in repairing the break or replacing the section or a portion thereof.

Further, in some embodiments, the location of the reflecting discontinuity can be located based upon information regarding the reflected light. For example, if the time from the emitting of the light signal to the time at which a reflected signal is received can be calculated, then the location of the break can be determined.

Other criteria may also be used in this computation. For example, the speed at which light travels through the material of the optical pathway, the actual distance a light signal travels within the optical pathway, and temperature, humidity, and other environmental factors, among other criteria, may be utilized.

In various embodiments, one or more amplifiers can be used to boost clarity of the received reflected signal. Additionally, the sensitivity of the receiver component can be increased. For example, signal averaging, avalanche gain in the detector, and decreasing amplifier bandwidth are some methods of increasing the sensitivity of the receiver component.

Figure 2:
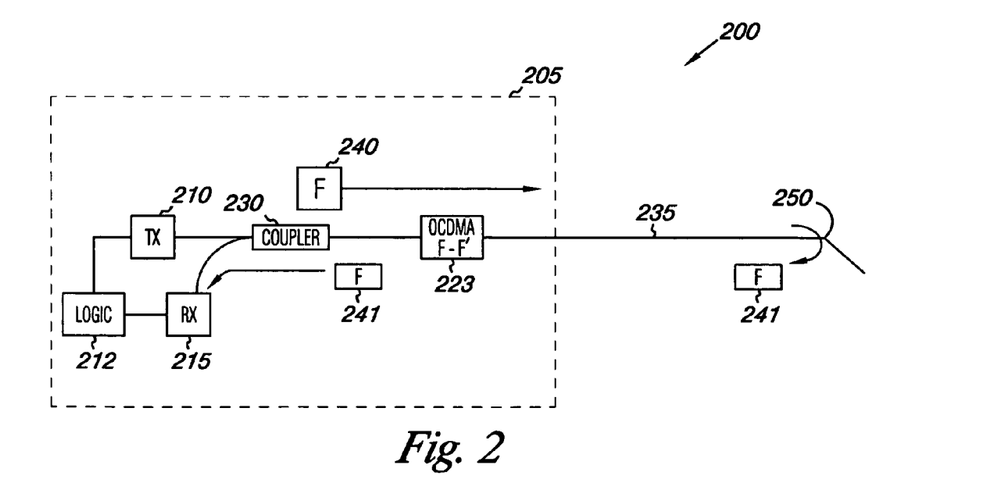
FIG. 2 is an illustration of another embodiment of an optical network of the present disclosure.

FIG. 2 is an illustration of another embodiment of an optical network of the present disclosure. The embodiment shown in FIG. 2 illustrates an optical network 200 which provides for OCDMA.

In the embodiment illustrated in FIG. 2, network 200 includes a transceiver 205 for sending and receiving light waves (e.g., OCDMA encoded signals) along an optical pathway (e.g., optical fiber 235). In various embodiments, the transceiver 205 can perform OTDR by transmitting a particular OCDMA signature code into optical fiber 235 and timing the arrival of reflected light corresponding with the particular OCDMA signature code (e.g., an OCDMA OTDR code). As stated above, OTDR measurements can provide benefits such as detecting a fault location in the optical fiber or detecting a "tap" (e.g., an unauthorized access into the fiber by an eavesdropper) among other benefits.

In various embodiments, the transceiver 205 can transmit a particular OCDMA signature code (e.g., a monitoring OCDMA code or OCDMA OTDR pulse code) used to obtain OTDR measurements, can be embedded within an OCDMA data stream.

The transceiver can include various components. As shown in the embodiment of FIG. 2, the transceiver 205 includes an optical emitter 210, an optical receiver 215, an OCDMA encoder/decoder component 223, a coupler 230, and a logic component 212.

Optical signals transmitted from emitter 210 can be encoded with various OCDMA codes such as monitoring codes (e.g., OCDMA OTDR pulse codes), which can be used to monitor a status of optical network 200 (e.g., the location of a reflecting discontinuity 250 in fiber 235). In the embodiment illustrated in FIG. 2, the OCDMA encoder/decoder component 223 is tunable as described above in connection with FIG. 1 (e.g., component 223 can include tunable delay lines that can be used to encode/decode multiple different OCDMA codes).

In this embodiment, the encoder/decoder component encodes an optical signal from emitter 210 with a specific OCDMA code "F". After the encoded optical signal 240 passes through component 223, the encoder/decoder switches or is tuned to a reverse, or inverse signature (e.g., "F'" as shown in FIG. 2) of code "F". Switching the component 223 to the inverse signature "F'" can be beneficial due to wavelength dispersion effects on OCDMA signals.

In some systems, the dispersion effects can become significant at various distances along an optical fiber, depending on various factors such as the bit rate, the number of wavelength channels, and/or the number of time chips per bit, among other factors. As an example, assuming pure silica fiber and an OCDMA signal having four channels at about 1550 nanometers, the material dispersion can be about 0.1 picosecond per meter.

In this example, assuming a 2 gigabit per second bit rate and assuming about 100 chips per bit, then each chip can have a period of about 5 picoseconds. Therefore, to delay one chip in an OCDMA signature bit enough to fall into another chip period can require about 5 picoseconds, which would occur at a distance of about 50 meters from the transceiver.

In various embodiments, the inverse signature (e.g., "F'") to which the encoder/decoder component switches depends on the location of a reflecting discontinuity (e.g., depending upon how far the encoded optical signal propagates prior to being reflected). For instance, the decoder of component 223 can be tuned to various inverse signature codes (e.g., "F'") depending on the location of reflecting discontinuity 250. Tuning the decoder 223 to an inverse signature "F'" can account for the dispersion effects described above, which can increase the precision of OTDR measurements by transceiver 205. For example, tuning the decoder to account for dispersion effects can enable a more accurate location determination of a fault in the optical fiber.

Accurate location determination of reflecting discontinuities (e.g., faults) can reduce event dead zones. Event dead zones can refer to the distance after a reflecting discontinuity (e.g., 250) until a second discontinuity can be detected and/or measured by an OTDR transceiver. Therefore, reducing event dead zones by accounting for dispersion effects can be useful for distinguishing reflecting discontinuities which may be relatively close together. Reducing event dead zones can also allow a transceiver (e.g., transceiver 205) to detect relatively small reflecting discontinuities which may have been too close to a relatively larger discontinuity to be detected prior to reducing the dead zone.

Upon reaching reflection point 250, the encoded optical signal 240 or a portion thereof can be reflected (e.g., backscattered) back toward the transceiver 205 along fiber 235. The reflected signal 241 can be directed through the optical coupler 230, can be decoded by encoder/decoder 223, and the decoded signal can be received by optical receiver 215. As described above, the decoded signal can be measured and a status of the optical pathway (e.g., fiber 235) can be determined based on the reflected light associated with the OCDMA code "F" and/or "F'" (e.g., by utilizing OTDR methodology).

Similar to receiver 115 of FIG. 1, the receiver 215 can receive both OCDMA data codes and monitoring codes (e.g., OCDMA OTDR codes). Also, as in the embodiment of FIG. 1 described above, an optical emitter and/or receiver component of transceiver 205 can be connected to a logic component 212 that can be used to perform various functions such as performing OTDR functions (e.g., determining a location of one or more reflecting discontinuities of an optical fiber based on timing the transmission and reception of optical signals such as encoded signal 240 and reflected signal 241, for example).

Figure 3:
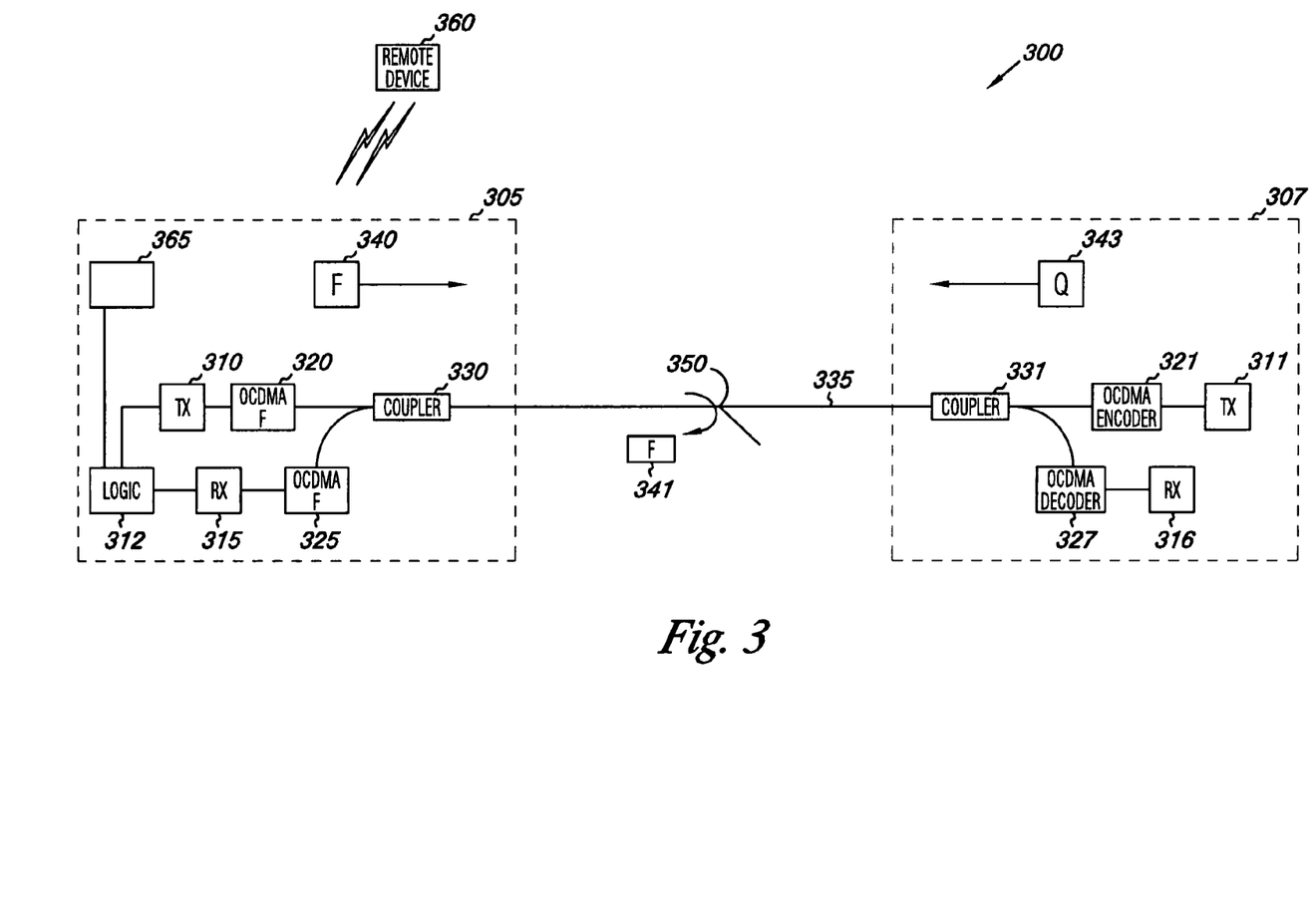
FIG. 3 is an illustration of an embodiment of a bidirectional optical network according to the present disclosure.

FIG. 3 is an illustration of an embodiment of a bidirectional optical network according to the present disclosure. The embodiment shown in FIG. 3 illustrates a bidirectional optical network 300 which provides for OCDMA. A bidirectional network can refer to an optical network in which optical signals can be transmitted in both directions down an optical fiber.

In the embodiment illustrated in FIG. 3, network 300 includes transceivers 305 and 307 for sending and receiving light waves (e.g., OCDMA encoded signals) along an optical pathway (e.g., optical fiber 335). In various embodiments, the transceiver 305 and/or the transceiver 307 can perform OTDR by transmitting a particular OCDMA signature code into optical fiber 335 and timing the arrival of reflected light corresponding with the particular OCDMA signature code (e.g., an OCDMA OTDR code).

In various embodiments, the transceiver 305 and/or 307 can transmit an OCDMA data stream (e.g., data streams 400 and 401 as described in FIG. 4). Also, in various embodiments, the transceiver 305 and/or 307 can transmit an OCDMA data stream that includes one or more OCDMA OTDR codes embedded within (e.g., data stream 402 as described in FIG. 4). The OCDMA OTDR codes (e.g., monitoring codes) can be used to obtain OTDR measurements, which can be used to determine the location of a fault in the optical fiber 335 as described above.

The transceivers 305 and 307 can include various components. As shown in the embodiment of FIG. 3, the transceiver 305 includes an optical emitter 310, an optical receiver 315, an OCDMA encoder 320, an OCDMA decoder 325, a coupler 330, a radio transmitter 365, and a logic component 312.

In the embodiment illustrated in FIG. 3, the OCDMA encoder 320 can encode an optical signal from emitter 310 with a specific OCDMA signature code (e.g., signature "F" as shown). The encoded optical signal 340 is directed into the optical fiber 335 and is transmitted toward transceiver 307.

Upon reaching reflection point 350, the encoded optical signal 340 or a portion thereof can be reflected (e.g., backscattered) back toward the transceiver 305 along fiber 335. The reflected signal 341 can be directed through the optical coupler 330 and can be decoded by decoder 325 (e.g., decoder 325 can be configured and/or tuned to filter out OCDMA codes other than code "F" in this example).

The decoded signal can be received by optical receiver 315. As described above, the decoded signal can be measured and a status of the optical pathway (e.g., fiber 335) can be determined based on the reflected light associated with the OCDMA code "F" (e.g., by utilizing OTDR methodology).

In various embodiments, monitoring information (e.g., information such as fault location measurements) can be communicated from a transceiver to a remote device. For example, in the embodiment illustrated in FIG. 3, the transceiver 305 includes a radio transmitter 365 coupled to logic component 312 and capable of wirelessly transmitting OTDR measurement information to a remote device 360. The remote device can be a computing device such as a desktop, laptop, fault detection device, or Personal Digital Assistant (PDA), among various other computing devices.

As shown in the embodiment of FIG. 3, the transceiver 307 includes an optical emitter 311, an optical receiver 316, an OCDMA encoder 321, an OCDMA decoder 327, and a coupler 331. In the embodiment illustrated in FIG. 3, the OCDMA encoder 320 can encode an optical signal from emitter 311 with a specific OCDMA signature code (e.g., signature "Q" as shown). The encoded optical signal 343 is directed into the optical fiber 335 and is transmitted toward transceiver 305.

As an example, the OCDMA encoded signal 343 can be a data stream in which signature code "Q" can represent a logic "1" data bit. In such embodiments, the transceiver 305 can be configured to receive and measure the transmitted encoded data signal 343 from transceiver 307. That is, the decoder 325 of transceiver 305 can be tuned to filter out OCDMA signature codes other than the desired data code to be received (e.g., data code "Q" in this example).

In this manner, the transceiver 305 can be used to perform OTDR measurements and data measurements. That is, the decoder 325 can be tuned to filter out codes other than "F" in order to perform OTDR and can be tuned to filter out codes other than code "Q" in order to receive the corresponding data stream.

As another example, the OCDMA encoded signal 343 can be a monitoring signal that includes an OCDMA OTDR monitoring code (e.g., a signal in which signature code "Q" represents a code whose reflected light is to be received by a receiver, such as receiver 316, in order to determine a location of a reflecting discontinuity off of which the encoded signal 343 was reflected). That is, transceiver 307 can also be configured to perform OTDR.

Similarly, the encoded signal 340 transmitted from transceiver 305 can be a data stream in which code "F" represents a logic "1" bit in a data stream. In such embodiments, the decoder 327 of transceiver 307 can be tuned to filter codes other than code "F" in order to receive the corresponding data stream. Thus, transceiver 307 can be coupled to fiber 335, can transmit data to another transceiver (e.g., 305, and can perform OTDR functions).

As in the embodiments of FIGS. 1 and 2 described above, an optical emitter and/or receiver component of transceiver 305 and/or 307 can be connected to a logic component that can be used to perform various functions such as performing OTDR functions (e.g., determining a location of one or more reflecting discontinuities of an optical fiber based on timing the transmission and reception of optical signals).

Embodiments of the present disclosure are not limited to the transceivers described in FIG. 3. For example, one or both of transceivers 305 and 307 can be a transceiver 105 as shown in FIG. 1 or a transceiver 205 as shown in FIG. 2.

Additionally, embodiments of the present disclosure can include other transceivers or transmitters and/or receivers capable of transmitting or receiving OCDMA signals. Transceiver embodiments of the present disclosure capable of optical network monitoring as described herein can be accomplished using transceivers having more or fewer components and/or having some components which are integrated into a single component.

Figure 4A:
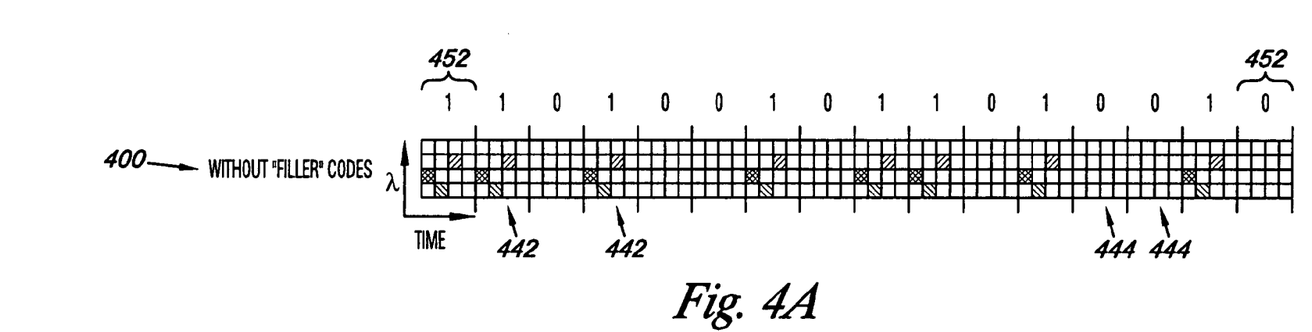
FIGS. 4A to 4C illustrate OCDMA code patterns suitable for use in various embodiments of the present disclosure.
Figure 4B:
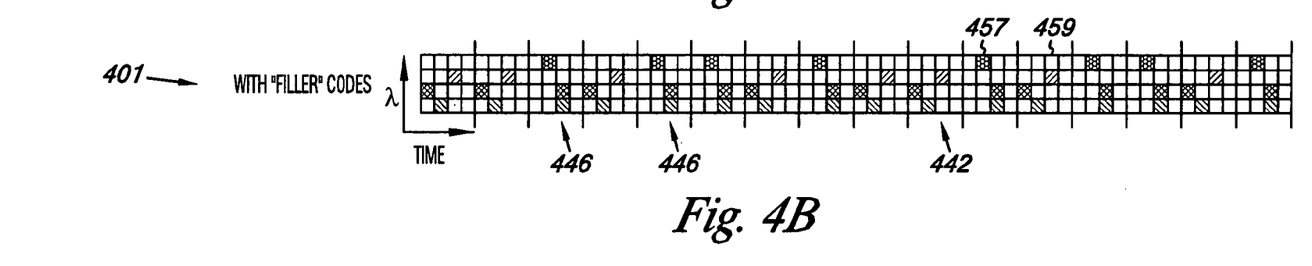
Figure 4C:
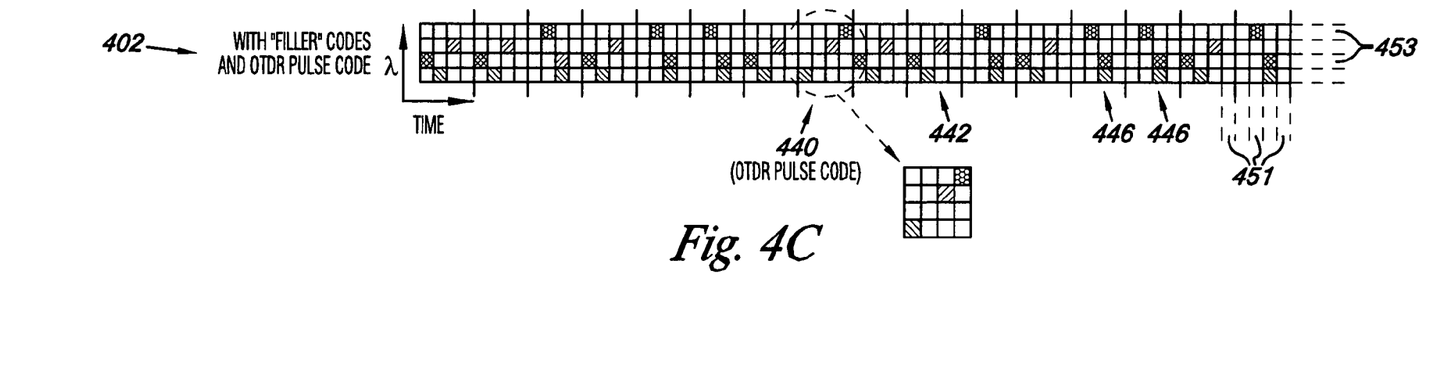

FIGS. 4A to 4C illustrate OCDMA code patterns suitable for use in various embodiments of the present disclosure. FIGS. 4A to 4C illustrate optical signals 400, 401, and 402 that represent a two-dimensional OCDMA encoded data stream that includes a number of bits which can each represent a binary data bit 452 (e.g., a logic 1 or 0 as shown). Each data bit 452 is represented by an OCDMA signature code (e.g., 440, 442, 444, and 446). As illustrated in FIGS. 4A to 4C, the OCDMA data bits are divided into a number of time chips 451 and spread across a number of wavelength slots 453 (e.g., wavelength channels).

Although each of the data bits 452 shown in FIGS. 4A to 4C include four time chips and four wavelength slots, various OCDMA data streams can include various numbers of time chips and/or wavelength slots. As an example, the data stream can include 40 wavelength slots, or wavelength channels, which can be separated by 0.6 nanometers. In this example of an OCDMA data stream, the data bits can include 100 time chips that have a width of 5 picoseconds.

In some embodiments, the wavelength channels are within the range of about 1,310 nanometers to about 1,625 nanometers. Wavelength channels within this range may be beneficial due to dispersion characteristics of the optical fiber at these wavelengths. It is also noted that it is possible for bits 452 within a particular data stream to include different numbers of slots and/or chips (e.g., the number of slots and/or chips may not be fixed).

As illustrated in FIGS. 4A to 4C, the OCDMA signature codes can be represented by a number of occupied elements 457 and unoccupied elements 459 in a two-dimensional array of wavelength versus time. In this manner, a particular code pattern of occupied and unoccupied elements can correspond with a unique OCDMA signature code (e.g., codes 440, 442, and 446).

In various OCDMA data streams, a logic "1" can be interpreted if all of the array elements for a particular signature code are occupied. In other data streams, the interpretation of a logic "0" or logic "1" can be based on a threshold number of occupied array elements 457 for a particular OCDMA signature code.

For instance a logic "1" can be interpreted if the number of occupied elements corresponding with the particular signature code is more than a threshold value (e.g., 5, 10, 25, etc.). Similarly, a logic "0" can be interpreted if the number of occupied elements corresponding with the particular signature code is less than a threshold value (e.g., 5, 10, 25, etc.).

The data stream 400 shown in FIG. 4A illustrates an OCDMA data stream in which a logic "1" bit is represented by a signature code 442 and a logic "0" is represented by a signature code 444. As shown, code 444 is an empty code (e.g., a bit which includes only unoccupied elements).

Data streams such as data stream 400 may be less secure and/or private than other OCDMA data streams such as those described in connection with FIGS. 4B and 4C. For instance, an unauthorized party (e.g., an eavesdropper) may be able to read the data stream by monitoring the power levels associated with the "1" bits of the data stream since the "0" bits are empty codes that may not have an associated power level.

As a security measure, some OCDMA schemes include "filler" codes to represent "0" data bits as shown in FIG. 4B. In data stream 401 of FIG. 4B, the "0" data bits are represented by an OCDMA filler code 446 in the place of the empty code 444 as shown in FIG. 4A.

In data stream 401, the logic "1" data bits are represented by signature code 442 as in FIG. 4A. Including "filler" codes 446 can make it more difficult for an unauthorized party from intercepting and interpreting the data stream because both the "0" and "1" bits are represented by codes having an associated power/energy level.

In FIG. 4B, each of the "0" bits are represented by filler code 446; however, in some schemes fewer than all of the "0" bits may be represented by the filler codes (e.g., only some "0" bits may be represented by filler codes). Moreover, in some schemes more than one different filler code may be used to represent "0" bits of a particular data stream.

The data stream 402 shown in FIG. 4C illustrates an OCDMA data stream that includes filler codes 446 in the place of "0" data bits as well as an embedded monitoring OCDMA code 440 (e.g., an OCDMA OTDR code) (shown as OTDR PULSE CODE in FIG. 4C). In the embodiment of FIG. 4C, the monitoring code 440 can replace a "0" data bit 444 of data stream 400 or a "0" data bit 446 of data stream 401 (e.g., a filler code). Although the data stream 402 includes one monitoring code 440, in various embodiments, a data stream can include several codes 440 embedded within the data stream at suitable intervals to monitor the health and status of an optical network and/or an optical fiber thereof.

As described in detail above in connection with FIGS. 1-3, in various embodiments of the present disclosure, an OCDMA monitoring code (e.g., code 440) can be directed into an optical fiber and reflected (e.g., backscattered) off of a discontinuity in the fiber. The reflected light associated with the specific monitoring code 440 can be filtered through an OCDMA decoder and received by an optical receiver (e.g., a photodetector).

In various embodiments, a status of the optical fiber can be determined based on the reflected light received. For example, a location of a fault in the optical fiber and/or the type of fault may be determined based on the timing of the reflected light associated with the monitoring code.

Embedding one or more OCDMA monitoring codes (e.g., 440) within an OCDMA data stream (e.g., 402) can be beneficial because the unique monitoring codes do not interfere with the data codes (e.g., 442 and 446) and/or other monitoring codes which may be passing over the same optical fiber or optical network. At the same time, the OCDMA data codes passing over the optical fiber do not interfere with OCDMA monitoring codes whose reflections are used to locate faults.

For example, reflected light associated with codes other than a particular OCDMA monitoring code signature are filtered out by the OCDMA decoder. Similarly, OCDMA signature codes associated with one or more data streams on an optical path can be filtered by the OCDMA decoder such that only the light waves associated with the reflected monitoring code is received to the optical receiver (e.g., the receiver performing OTDR measurements).

Figure 5:
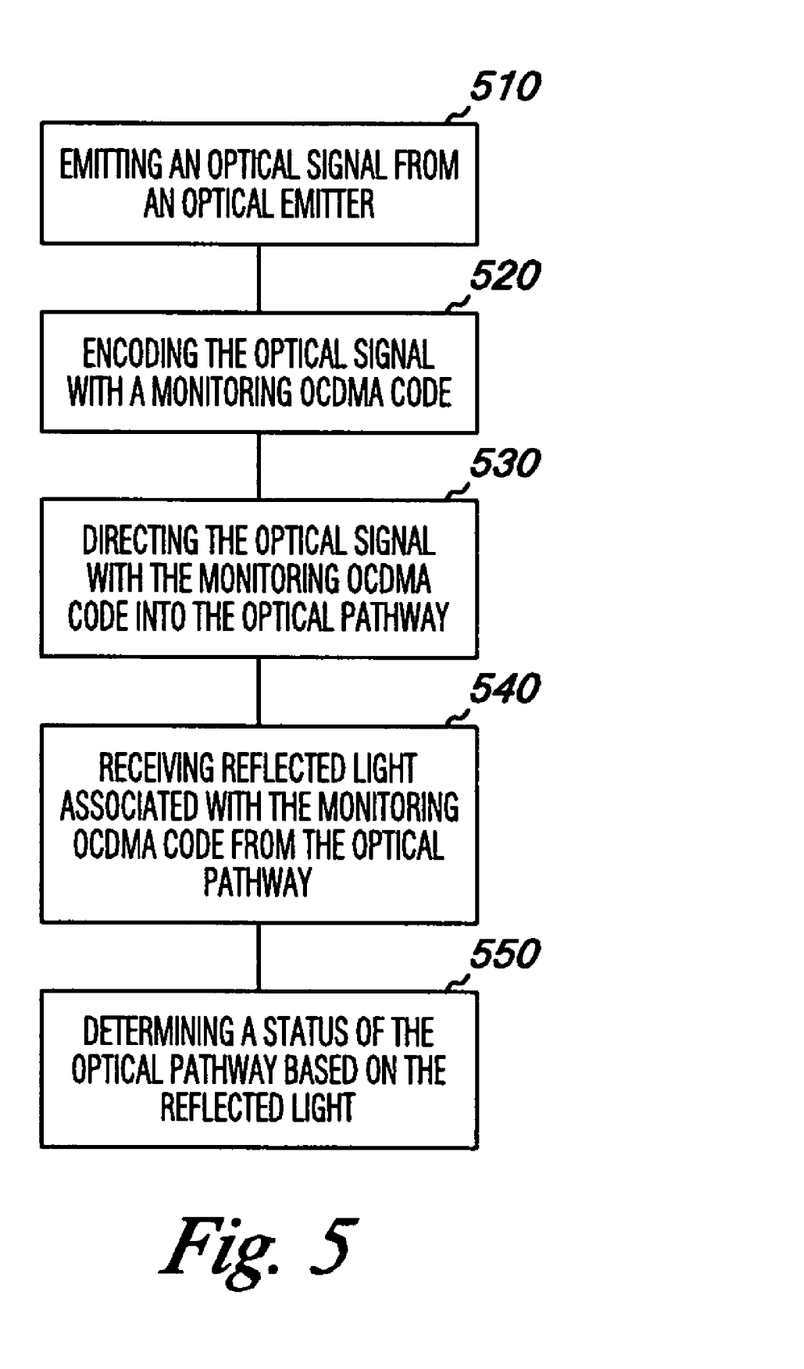
FIG. 5 is a block diagram of a method of monitoring an optical pathway according to an embodiment of the present disclosure.

FIG. 5 is a block diagram of a method of monitoring an optical pathway according to an embodiment of the present disclosure. As shown at block 510, the method includes emitting an optical signal from an optical emitter (e.g., a light emitting source).

At block 520, the method includes encoding the optical signal with a monitoring OCDMA code. As discussed above in FIGS. 1-3, the OCDMA encoder can utilize various encoding technologies such as FBG and AWG and/or can be tunable in order to encode an emitted optical signal with multiple different OCDMA signature codes. The monitoring code can be an OCDMA OTDR pulse code that may be embedded into an OCDMA data stream and can be used to monitor an optical network and/or an optical fiber thereof.

At block 530, the method includes directing the optical signal with the monitoring code into the optical pathway (e.g., an optical fiber). At block 540 the method includes receiving reflected light associated with the monitoring OCDMA code from the optical pathway. As described above in FIGS. 1-3, the time chips and wavelength slots corresponding to the monitoring OCDMA code of the optical signal can be reflected from one or more discontinuities (e.g., faults in the pathway such as connection points of one pathway to another) bends in the pathway, breaks in the pathway, among other faults.

At block 550, the method includes determining a status of the optical pathway based on the reflected light. For example, the reflected light corresponding to the monitoring OCDMA code can be received to a transceiver capable of performing OTDR as described herein. The reflected light can be decoded and measured by an optical receiver which can be coupled to a logic component (e.g., a microprocessor or computing device) among other logic components which can perform OTDR functions such as timing the transmission and receipt of the monitoring OCDMA code and determining the location of one or more discontinuities in the optical pathway.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the present disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method for monitoring an optical pathway, comprising:
    emitting an optical signal from an optical emitter;
    encoding the optical signal with a monitoring optical code division multiple access (OCDMA) code embedded in an OCDMA data stream;
    directing the optical signal with the monitoring OCDMA code into the optical pathway;
    receiving reflected light associated with the monitoring OCDMA code from the optical pathway; and
    determining a status of the optical pathway based on the reflected light.

2. The method of claim 1, wherein the method includes embedding the monitoring OCDMA code in an OCDMA data stream that includes a filler code to represent one or more zero bits of the data stream, and wherein the monitoring OCDMA code is embedded so as to replace at least one of the one or more zero bits.

3. The method of claim 1, wherein the method includes filtering the reflected light with a decoder prior to receiving the reflected light to an optical receiver.

4. The method of claim 1, wherein receiving the reflected light to an optical receiver includes receiving the reflected light to a receiver of an optical time domain reflectometer (OTDR).

5. The method of claim 1, wherein the optical pathway is part of a bidirectional network, and wherein receiving reflected light associated with the monitoring OCDMA code from the optical pathway includes receiving reflected light to a receiver which can receive a data stream.

6. The method of claim 1, wherein determining a status of the optical pathway based on the reflected light includes determining a fault location of the optical pathway.

7. The method of claim 6, wherein the method includes timing the reception of the reflected light associated with the monitoring OCDMA code in order to determine the fault location.

8. An optical pathway monitoring apparatus, comprising:
an optical emitter for emitting an optical signal along an optical pathway that is to be monitored;
an encoder for encoding the emitted optical signal with a specific OCDMA OTDR code embedded in an OCDMA data stream;
an optical receiver for receiving reflected light associated with the specific OCDMA code; and
a logic component that can compute the distance of a reflection point based upon the elapsed time between the emitting of the optical signal by the optical emitter and the reception of the reflected light.

9. The apparatus of claim 8, the OCDMA data stream comprising at least one OCDMA code different from the specific OCDMA OTDR code.

10. The apparatus of claim 9, wherein the receiver is configured to receive the OCDMA data stream and the reflected light associated with the specific OCDMA OTDR code.

11. The apparatus of claim 10, wherein the OCDMA data stream includes a first code which represents a data one bit and a second code which represents a data zero bit, wherein the first and second codes are different than the specific OCDMA OTDR code.

12. The apparatus of claim 11, wherein at least one of the zero bits of the OCDMA data stream is replaced with the specific OCDMA OTDR code.

13. The apparatus of claim 8, wherein the apparatus includes a decoder for decoding the emitted optical signal prior to the reflected light associated with the specific OCDMA OTDR code being received by the optical receiver.

14. The apparatus of claim 8, wherein the optical receiver is a photodetector.

15. The apparatus of claim 14, wherein the optical receiver is a p-i-n diode detector.

16. The apparatus of claim 8, wherein the optical emitter is a laser.

17. A monitoring system, comprising:
an optical pathway;
an optical emitter for emitting an optical signal along the optical pathway;
an encoder for encoding the optical signal with a first OCDMA code and with a binary data stream represented by a second and a third OCDMA code;
a decoder for decoding the OCDMA encoded optical signal;
an optical detector for detecting reflected light associated with the decoded optical signal, wherein the reflected light corresponds to a reflection point in the optical pathway; and
a logic component that can compute the distance of the reflection point based upon the elapsed time between the emitting of the optical signal by the optical emitter and the reception of the reflected light to the optical detector.

18. The system of claim 17, wherein the first OCDMA code is a two-dimensional code including a number of different wavelength channels.

19. The system of claim 17, wherein the decoder is a tunable decoder that can be tuned to decode the first, second, and third ODCMA codes.

20. The system of claim 17, wherein the data stream includes a series of bits and wherein the second OCDMA code represents a logic level low and the third OCDMA code represents a logic level high.

21. The system of claim 20, wherein the encoder is configured to insert the first OCDMA code in the place of the second OCDMA code for at least one logic level low in the series of bits.

22. The system of claim 17, wherein the optical pathway is within a bidirectional optical network.

23. The system of claim 17, wherein the optical detector is configured to detect the decoded reflected light and a decoded OCDMA data stream.

24. The system of claim 17, wherein the system includes a transmitter for communicating monitoring information to a remote device.

25. A method for performing optical time domain reflectometry (OTDR), comprising:
providing an optical code division multiple access (OCDMA) network that includes a transceiver, configured to perform OTDR, coupled to a fiber optic pathway;
transmitting, from a light emitting source of the transceiver, an OCDMA encoded signal that includes an OTDR pulse code embedded within an OCDMA data stream into the fiber optic pathway; and
determining a location of a reflecting discontinuity of the fiber optic pathway based on timing a reception of light associated with the OTDR pulse code, which is reflected from the reflecting discontinuity and received by a receiving component of the transceiver.

26. The method of claim 25, wherein providing an OCDMA network that includes a transceiver configured to perform OTDR includes providing an OCDMA network that includes a transceiver which includes a tunable OCDMA encoder/decoder component, wherein the tunable encoder/decoder component switches to an inverse of the OTDR pulse code after the OCDMA encoded signal is encoded.

27. The method of claim 26, wherein switching the encoder/decoder component to an inverse of the OTDR pulse code includes switching the encoder/decoder component to a particular inverse of the OTDR pulse code depending on the location of a specific reflecting discontinuity of the fiber optic pathway.

* * * * *